United States Patent
Williams et al.

(10) Patent No.: US 10,823,121 B2
(45) Date of Patent: Nov. 3, 2020

(54) THREE-PORT TURBO PURGE MODULE

(71) Applicant: Continental Powertrain USA, LLC, Auburn Hills, MI (US)

(72) Inventors: Benjamin Dominick Manton Williams, Chatham (CA); Jaime Altes Sosa, Chatham (CA); David Rene Forgeron, Tilbury (CA); Ravinder Singh Gill, Kitchener (CA)

(73) Assignee: Continental Powertrain USA, LLC, Auburn Hills, MI (US)

( * ) Notice: Subject to any disclaimer, the term of this patent is extended or adjusted under 35 U.S.C. 154(b) by 0 days.

(21) Appl. No.: 16/374,058

(22) Filed: Apr. 3, 2019

(65) Prior Publication Data

US 2019/0309709 A1 Oct. 10, 2019

Related U.S. Application Data

(60) Provisional application No. 62/653,934, filed on Apr. 6, 2018.

(51) Int. Cl.
*F02M 27/00* (2006.01)
*F02B 37/16* (2006.01)
(Continued)

(52) U.S. Cl.
CPC ........... *F02M 27/00* (2013.01); *F02B 37/164* (2013.01); *F02M 25/0836* (2013.01); *F04F 5/14* (2013.01)

(58) Field of Classification Search
CPC .. F02M 27/00; F02M 25/0836; F02M 25/089; F02B 37/164; F02B 37/00; F04F 5/14; F04F 5/20
See application file for complete search history.

(56) References Cited

U.S. PATENT DOCUMENTS 6,089,019 A * 7/2000 Roby ..................... F02M 26/51
123/568.11
9,086,036 B2 * 7/2015 Inoguchi ............ F02M 25/0836
(Continued)

FOREIGN PATENT DOCUMENTS

| CN | 102588154 A | 7/2012 |
|---|---|---|
| DE | 102016210570 A1 | 12/2017 |
| WO | 2015/089176 A1 | 6/2015 |

OTHER PUBLICATIONS

International Search Report and Written Opinion dated Jun. 16, 2019 from corresponding International Patent Application No. PCT/US2019/025802.

*Primary Examiner* — Phutthiwat Wongwian
*Assistant Examiner* — Sherman D Manley

(57) ABSTRACT

A three-port turbo purge module, including a housing having a cavity, and two check valves. During a first mode of operation, the first check valve is open and the second check valve is closed by vacuum pressure generated in an intake manifold, such that purge vapor flows from an inlet port into the cavity, through the first check valve, and into a first port. During a second mode of operation, where the intake manifold is operating under positive pressure, the first check valve is closed such that pressurized air flowing into the first port is accelerated through a venturi device disposed in the cavity, and the second check valve is open such that purge vapor flows from the inlet port into the cavity, through the venturi device and mixes with the high-velocity air, through the second check valve into the second port.

14 Claims, 3 Drawing Sheets

(51) Int. Cl.
 *F02M 25/08* (2006.01)
 *F04F 5/14* (2006.01)

(56) References Cited

U.S. PATENT DOCUMENTS

| | | | |
|---|---|---|---|
| 9,359,978 B2 * | 6/2016 | Balsdon | F02M 25/0836 |
| D840,922 S * | 2/2019 | Fletcher | D13/101 |
| 2011/0132311 A1 * | 6/2011 | Pursifull | F02D 9/08 |
| | | | 123/184.56 |
| 2012/0318243 A1 * | 12/2012 | Williams | F02M 25/0836 |
| | | | 123/520 |
| 2012/0318244 A1 * | 12/2012 | Williams | F02D 41/0032 |
| | | | 123/520 |
| 2013/0152904 A1 * | 6/2013 | Balsdon | F04F 5/24 |
| | | | 123/518 |
| 2014/0251284 A1 | 9/2014 | Plymale et al. | |
| 2014/0311602 A1 * | 10/2014 | Jefford | F16K 31/02 |
| | | | 137/899 |
| 2014/0345573 A1 * | 11/2014 | Jefford | F02M 25/0818 |
| | | | 123/519 |
| 2015/0083094 A1 | 3/2015 | Pursifull | |
| 2015/0159665 A1 * | 6/2015 | Fletcher | F02B 37/16 |
| | | | 415/58.4 |
| 2015/0159677 A1 * | 6/2015 | Hampton | F04F 5/20 |
| | | | 417/182 |
| 2015/0345517 A1 * | 12/2015 | Fletcher | F04F 5/54 |
| | | | 417/65 |
| 2015/0354600 A1 * | 12/2015 | Fletcher | F04F 5/54 |
| | | | 417/179 |
| 2019/0301402 A1 * | 10/2019 | Calavin | F02M 25/0836 |
| 2019/0309708 A1 * | 10/2019 | Williams | F02D 41/0032 |

\* cited by examiner

THREE-PORT TURBO PURGE MODULE

CROSS-REFERENCE TO RELATED APPLICATIONS

This application claims the benefit of provisional application 62/653,934, filed Apr. 6, 2018. The disclosure of the above application is incorporated herein by reference.

FIELD OF THE INVENTION

The invention relates generally to a vapor purge system having a three-port turbo purge module with a reduced number of connections to an intake system of an engine, and a reduced number of components to provide for more optimal packaging.

BACKGROUND OF THE INVENTION

Current purge systems for engines having a turbocharger unit use a venturi vacuum generator (i.e., a vacuum pump) to allow purge of the evaporative system while the turbocharger unit is activated (manifold under positive pressure). This has traditionally been accomplished with discreet components added down-stream of a purge valve. The purge valve itself may contain check valves to direct the purge flow appropriately.

These typical arrangements of a venturi vacuum generator, check valves, and purge valves result in large, complex hose routing with three different connections to various parts of the manifold, as well as all the connections between components.

Accordingly, there exists a need for a vapor purge system, which has reduced components such that the system is more suitable to meeting various packaging requirements, is simpler to manufacture, and is less costly.

SUMMARY OF THE INVENTION

In one embodiment, the present invention is an arrangement of an air flow system for a turbocharged internal combustion engine having a three-port turbo purge module (TPM) which reduces the number of hose connections between the module and the intake flow path to the engine intake manifold.

The turbo purge module solution achieves two major advantages:

Reduces the number of hose connections to the intake manifold from three to two.

Integrates the venturi vacuum generator, or venturi device, into the same overall packaging as the purge valve and includes integrated check valves.

The TPM has a purge inlet port connected to the evaporative emissions canister. A common connection to the intake manifold post-throttle plate serves as both the naturally aspirated line, and as the venturi pressure feed line. Inside the TPM, the air flow has two possible paths, one with a check valve blocking turbo pressure, and a second allowing pressurized air to pass through the venturi vacuum generator. A third connection to the air-box passes through one of the integrated check valves acting as the outlet of the venturi vacuum generator.

In one embodiment, the present invention is a three-port turbo purge module, which includes a housing, a cavity disposed in the housing, a first check valve, a second check valve, a first port selectively in fluid communication with the cavity when the first check valve is open, and a second port selectively in fluid communication with the cavity when the second check valve is open. During a first mode of operation, the first check valve is open and the second check valve is closed such that purge vapor flows from the inlet port into the cavity, through the first check valve, and through the first port. A venturi device is disposed in the cavity, and during a second mode of operation, the first check valve is closed such that pressurized air flowing into the first port is accelerated through the venturi device, opening the second check valve such that purge vapor flows from the inlet port into the cavity and mixes with air flowing through the venturi device, then flows through the second check valve and through the second port. The pressurized air flowing into the first port during the second mode of operation applies pressure to the first check valve, closing the first check valve.

In an embodiment, an inlet port is in fluid communication with a carbon canister such that purge vapor is directed from the carbon canister through the inlet port and into the cavity.

In an embodiment, the first port is in fluid communication with a conduit in an area of the conduit that is upstream of an intake manifold of an engine and downstream from a turbocharger unit, and the second port is in fluid communication with an intake passage at an area of the intake passage that is located upstream of the turbocharger unit.

In an embodiment, the venturi device includes a jet portion in fluid communication with the first port and the cavity, and a mixing portion located in the cavity and downstream from the jet portion. During the second mode of operation, pressurized air flowing from the first port accelerates through the jet portion and into the mixing portion, increasing the air velocity and creating the vacuum pressure in the cavity such that the purge vapor in the cavity flows into and mixes with the high-velocity air in the mixing portion.

In one embodiment, the venturi device includes a valve seat integrally formed as part of the mixing portion. The second check valve is in contact with the valve seat when the second check valve is closed, and the second check valve is moved away from the valve seat when the check valve is open.

In an embodiment, a first side wall is formed as part of the housing, and the first check valve is partially mounted to the first side wall. A second sidewall is also formed as part of the housing, and the second check valve is partially mounted to the second side wall. The jet portion is mounted to the first side wall, and part of the mixing portion is integrally formed as part of the second sidewall.

In an embodiment, during the second mode of operation the high-velocity air flowing through the venturi device applies pressure to the second check valve such that the second check valve is opened.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
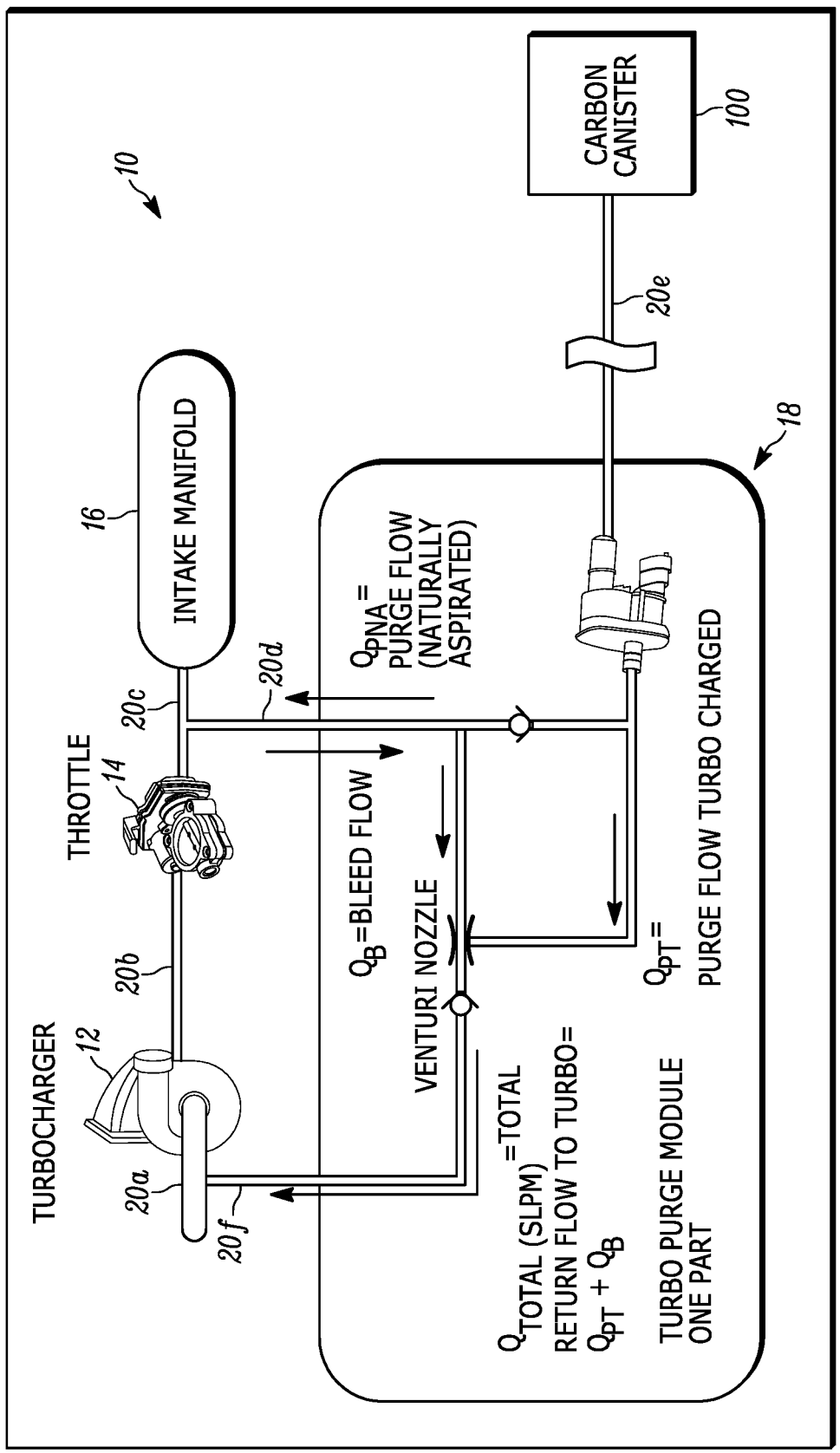
FIG. 1 is a diagram of a vapor purge system having a three-port turbo purge module, according to embodiments of the present invention.

A diagram of a vapor purge system having a three-port turbo purge module according to the present invention is shown in the FIG. 1 generally at 10. The system 10 includes a plurality of conduits, one of the conduits is an intake passage 20a which intakes air from the atmosphere. Located downstream of and in fluid communication with the intake passage 20a is a turbocharger unit 12 and located downstream of and in fluid communication with the turbocharger unit 12 is a throttle assembly 14. The throttle assembly 14 controls the amount of air flow into an intake manifold 16, which is part of an engine. Air flows from the throttle assembly 14 into the intake manifold 16.

As mentioned above, a plurality of conduits also provides fluid communication between the various components. Air flows through the conduits between the various components, and the direction of airflow through the conduits varies, depending on the mode of operation of each component. More specifically, in addition to the intake passage 20a providing fluid communication from the atmosphere to the turbocharger unit 12, there is a second conduit 20b providing fluid communication between the turbocharger unit 12 and the throttle assembly 14. There is also a third conduit 20c providing fluid communication between the throttle assembly 14 and the intake manifold 16.

Figure 2:
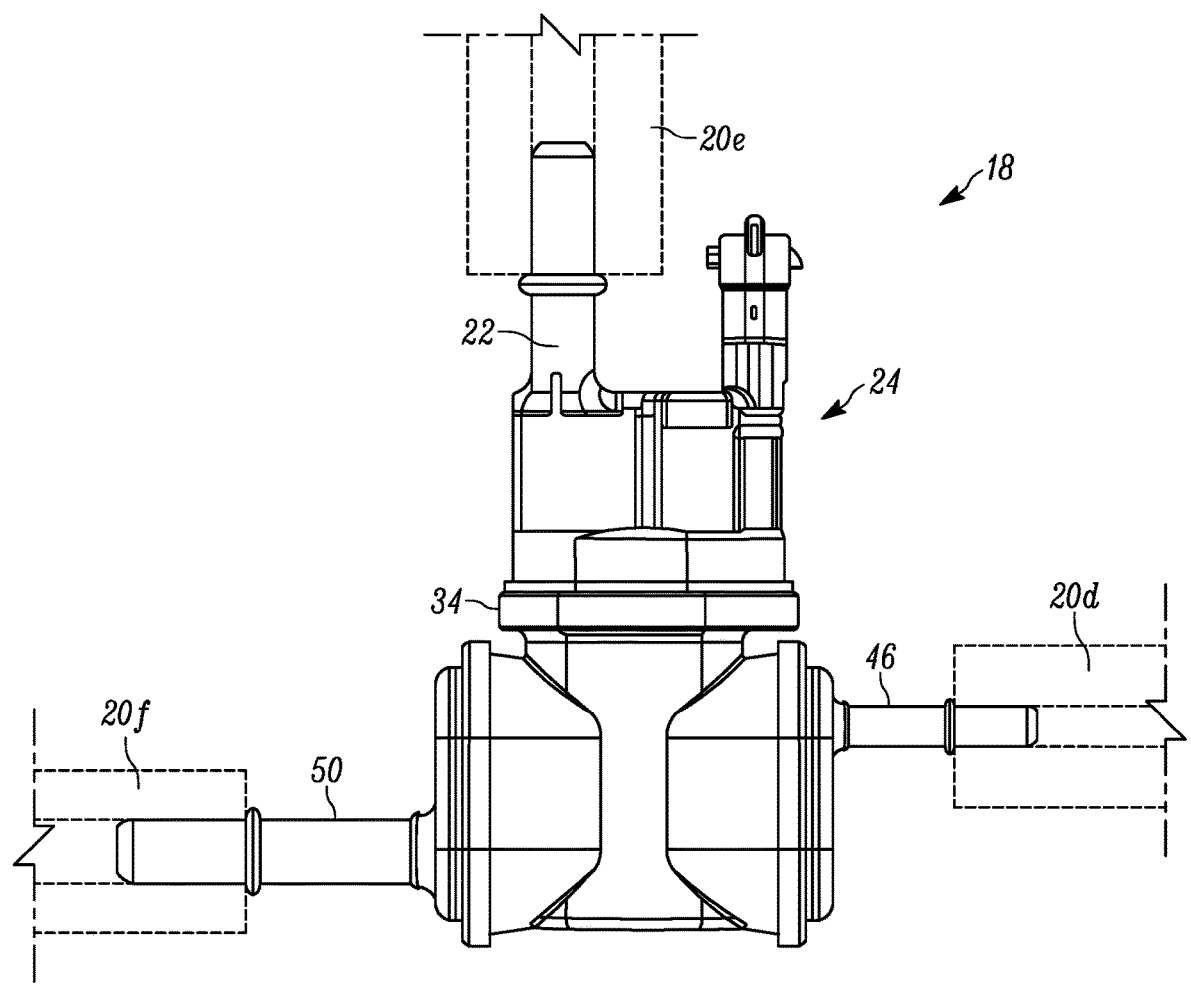
FIG. 2 is a side view of a three-port turbo purge module, according to embodiments of the present invention.
Figure 3:
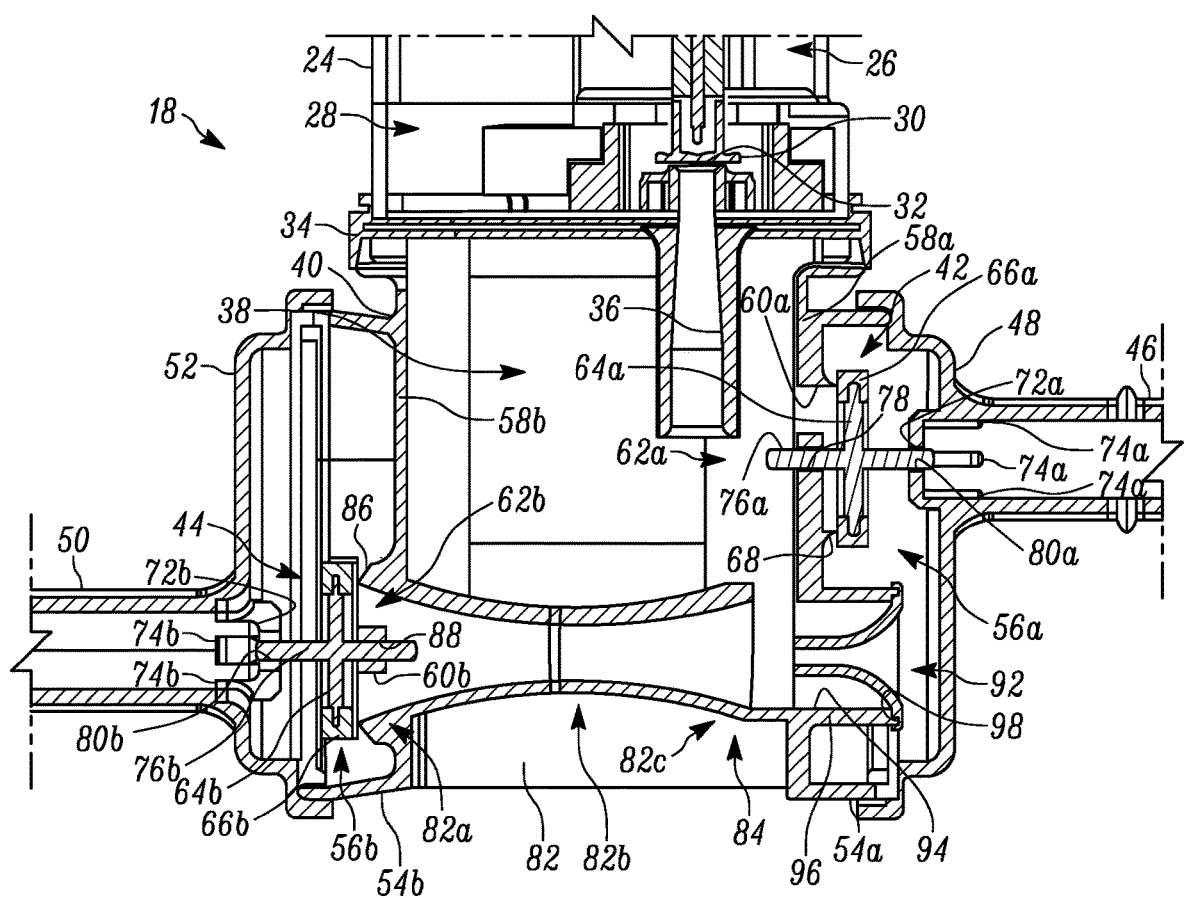
FIG. 3 is a sectional view of various components of a three-port turbo purge module, according to embodiments of the present invention.

Referring generally to FIGS. 1-3, a fourth conduit 20d is in fluid communication with the third conduit 20c and a three-port turbo purge module, shown generally at 18. Additionally, a fifth conduit 20e is connected to and in fluid communication with an inlet port 22 which is integrally formed with an overmold assembly housing 24. Disposed within the overmold assembly housing 24 is a solenoid assembly, shown generally at 26, and the solenoid assembly 26 is disposed within a cavity, shown generally at 28, formed as part of the overmold assembly housing 24. The solenoid assembly 26 includes and is able to control the movement of a valve member 30, where the valve member 30 is selectively in contact with a valve seat 32.

Referring to FIG. 3, the valve seat 32 is integrally formed as part of a cap portion 34, where the cap portion 34 is connected to the overmold assembly housing 24. Integrally formed with the valve seat 32 is an outlet port 36, which is also part of the cap portion 34, and extends into a cavity, shown generally at 38, of a housing 40. There is a first check valve, shown generally at 42, and a second check valve, shown generally at 44, where both check valves 42,44 are in fluid communication with the cavity 38.

The three-port turbo purge module 18 also includes a first port 46 which is connected to and in fluid communication with the fourth conduit 20d. Integrally formed with the first port 46 is a first cap portion 48, and the first cap portion 48 is connected to the housing 40. The three-port turbo purge module 18 also includes a second port 50 integrally formed with a second cap portion 52, where the second cap portion 52 is also connected to the housing 40. More specifically, the first cap portion 48 is connected to a first outer flange 54a.

The connection between the first cap portion 48 and the first outer flange 54a may be any suitable connection, such as snap-fitting, welding, an adhesive, or the like. The connection between the first cap portion 48 and the first outer flange 54a forms a first check valve cavity, shown generally at 56a, and formed as part of a first side wall 58a of the housing 40 is a plurality of first check valve apertures, where one of the first check valve apertures 60a is shown in FIG. 3. The plurality of first check valve apertures 60a allow for fluid communication between the first check valve cavity 56a and the cavity 38 when the first check valve 42 is in an open position.

The first check valve 42 also includes a first valve member 62a, which in this embodiment is a first valve plate 64a, located in the first check valve cavity 56a, and includes a first seal member 66a that selectively contacts a first valve seat 68 formed as part of the first side wall 58a. The valve seat 68 at least partially surrounds the aperture 60a, and no air passes around the valve plate 64a when the seal member 66a is in contact with the valve seat 68, where the first check valve 42 is in the closed position. Also formed as part of the first cap portion 48 is a first base portion 72a, and the first valve plate 64a is in contact with the first base portion 72a when the first check valve 42 is in the open position. Formed as part of the first base portion 72a is a first plurality of vents 74a which are in fluid communication with the cavity 56a, such that when the seal member 66a is not in contact with the valve seat 68, air and/or purge vapor is able to flow from the cavity 38 through the apertures 60a into the cavity 56a, and through the vents 74 and into the first port 46.

Formed with the valve plate 64a is a first guide member 76a, which is cylindrical in shape, and partially extends into an aperture 78 formed as part of the side wall 58a, and also partially extends into another aperture 80a formed as part of the base portion 72a. The first guide member 76a is able to slide freely in the apertures 78,80a such that the valve plate 64a is not biased in a particular direction. The guide member 76 is able to slide freely in the apertures 78,80a because there is a clearance between the outer diameter of the guide member 76 and the diameter of each of the apertures 78,80a, and this clearance allows for some of the purge vapor to pass through the apertures 78,80a. However, when the seal member 66a is in contact with the valve seat 68, purge vapor flowing through the clearance around the guide member 76 in the aperture 78 does not flow around the valve plate 64a or the seal member 66a.

The second check valve 44 includes similar components to the first check valve 42, and functions in a similar manner. The components of the second check valve 44 include the second cap portion 52 connected to a second outer flange 54b of the housing 40. Again, the connection between the second cap portion 52 and the second outer flange 54b may be any suitable connection, such as snap-fitting, welding, an adhesive, or the like. A second check valve cavity, shown generally at 56b, is formed by the connection of the cap portion 52 to the second outer flange 54b. A second side wall 58b is also formed as part of the housing 40, and the second side wall 58b is integrally formed with an end portion of a mixing portion, shown generally at 82, of a venturi device, shown generally at 84. More specifically, the second side wall 58b is integrally formed with the expansion portion, shown generally at 82a, of the mixing portion 82.

A second plurality of check valve apertures 60b is formed as part of the end portion of the mixing portion 82 to provide fluid communication between the mixing portion 82 and the second check valve cavity 56b. The second valve member 62b having a second valve plate 64b and a second seal member 66b is located in the second check valve cavity 56b and either the seal member 66b contacts a valve seat 86 formed as part of the end portion of the expansion portion 82a, or the second valve plate 64b contacts a second base portion 72b formed as part of the second cap portion 52, depending on whether the second check valve 44 is in the open position or closed position. The base portion 72b and the second cap portion 52 are integrally formed as part of the second port 50. Similarly, to the first base portion 72a, there is a second plurality of vents 74b formed as part of the second base portion 72b. A second guide member 76b is integrally formed with the valve plate 64b, and the second guide member 76b extends into an aperture 88 formed as part of a support member (a portion of which is shown) and the aperture 80b formed as part of the second base portion 72b.

The mixing portion 82 also includes a throat portion, shown generally at 82b, which is integrally formed as part of the expansion portion 82a. The mixing portion 82 also includes a compression portion 82c, which is integrally formed with the throat portion 82b. The mixing portion 82 is hollow, and provides selective fluid communication between the cavity 38 and the second check valve cavity 56b, depending on whether the second check valve 44 is in the open or closed position.

In addition to the mixing portion 82, the venturi valve device 84 also includes a jet portion, shown generally at 92, which is integrally formed as part of the first cap portion 48. There is a circular aperture 94 which is formed as part of the first side wall 58a, where the circular aperture 94 includes a wall portion 96 which is integrally formed as part of the first side wall 58a. Part of the wall portion 96 extends into a groove 98 formed as part of the first cap portion 48. The jet portion 92 is disposed in the circular aperture 94. The jet portion 92 is generally conical in shape and provides continuous fluid communication between the cavity 38 and the first check valve cavity 56a.

Referring again generally to FIGS. 1-3, there is also a carbon canister 100 connected to and in fluid communication with the fifth conduit 20e, such that the carbon canister 100 is in fluid communication with the three-port turbo purge module 18. More specifically, the fifth conduit 20e is connected to the inlet port 22, as mentioned above. A sixth conduit 20f provides fluid communication between the three-port turbo purge module 18 and the intake passage 20a. More specifically, the sixth conduit 20f is connected to and in fluid communication with the second port 50.

The fourth conduit 20d is connected to the first port 46, such that when the turbocharger unit 12 is active, some of the pressurized air generated by the turbocharger unit 12 is able to flow from the third conduit 20c, through the fourth conduit 20d, and to the three-port turbo purge module 18.

The vapor purge system 10 has multiple modes of operation. In a first mode of operation, when the turbocharger unit 12 is not active, air flows through the intake passage 20a, the turbocharger unit 12, the throttle assembly 14, and into the intake manifold 16. There is vacuum pressure in the intake manifold 16 created by the engine during the first mode of operation, drawing air into the intake manifold 16. This vacuum pressure is also in the fourth conduit 20d, and when the valve member 30 of the three-port turbo purge module 18 is in an open position, the vacuum pressure causes the first check valve 42 to open, where during the first mode of operation, the vacuum pressure draws the purge vapor from canister 100, through the fifth conduit 20e, the three-port turbo purge module 18, and into the fourth conduit 20d. More specifically, during the first mode of operation, the vacuum pressure draws the valve plate 64a away from the valve seat 68 and toward the first base portion 72a, such that the valve plate 64a contacts the first base portion 72a, allowing purge vapor to pass from canister 100, through the fifth conduit 20e, through the cavity 28 of the overmold assembly housing 24 and into the cavity 38, through the first check valve apertures 60a, the first check valve cavity 56a, through the vents 74a, the first port 46 and into the fourth conduit 20d. The purge vapor then flows through the fourth conduit 20d, through the third conduit 20c where the purge vapor mixes with air and flows into the intake manifold 16. During the first mode of operation, as mentioned above, there is vacuum pressure in the cavity 38, and therefore there is also vacuum pressure in the mixing portion 82. This same vacuum pressure in the mixing portion 82 also causes the second check valve 44 to close, such that no air passes through the mixing portion 82 into the second check valve cavity 56b. More specifically, the valve plate 64b of the second valve member 62b moves away from the second base portion 72b and towards the valve seat 86, such that the seal member 66b is placed in contact with the valve seat 86, placing the second check valve 44 in the closed position. Also, any purge vapor that does not pass through the first check valve 42 flows from the cavity 38 through the jet portion 92 and into the first check valve cavity 56a, and into the first port 46, mixing with the air and purge vapor that has flowed through the first check valve 42 and into the first port 46.

The vapor purge system 10 also has a second mode of operation, where the turbocharger unit 12 is activated, and air flowing into the turbocharger unit 12 from the intake passage 20a becomes pressurized, the pressurized air then flows through the throttle assembly 14, and the pressurized air then flows into the intake manifold 16. In this second mode of operation, the manifold 16 is operating under positive pressure. During the second mode of operation, the fourth conduit 20d is also operating under positive pressure, which results in pressurized air flowing into the first port 46. During the second mode of operation, the pressurized air then flows through the vents 74a and into the first check valve cavity 56a and applies pressure to the first valve plate 64a, moving the valve plate 64a towards the valve seat 68 such that the seal member 66a contacts the valve seat 68, placing the first check valve 42 in the closed position. Because the first check valve 42 is in the closed position, the pressurized air flowing into the first check valve cavity 56a is forced to flow into the jet portion 92 of the venturi device 84, which restricts airflow and therefore increases the velocity of the air flowing through the jet portion 92, such that the air remaining in the first check valve cavity 56a remains pressurized. During the second mode of operation, the restriction of the flow of air through the jet 92 maintains a high pressure in check valve cavity 56a. The first check valve 42 is exposed to this high pressure, which also keeps the first check valve 42 in the closed position. The pressurized air accelerates through the jet portion 92, and the jet portion 92 directs the high-velocity air into the mixing portion 82 of the venturi device 84. The air flowing through the mixing portion 82 applies pressure to the valve plate 64b, moving the valve member 62b away from the valve seat 86, such that the seal member 66b is no longer in contact with the valve seat 86. The valve member 62b moves towards the second base portion 72b such that the valve plate 64b is in contact with the base portion 72b, placing the second check valve 44 in an open position.

The flow of high-velocity air from the jet portion 92 into the mixing portion 82 creates a vacuum in the cavity 38, such that when the valve member 30 is in the open position, purge vapor flowing into the cavity 38 from the cavity 28 of the overmold assembly housing 24 is drawn into the mixing portion 82, such that the purge vapor mixes with the high-velocity air flowing into the mixing portion 82 from the jet portion 92. The speed of the high-velocity air is reduced after flowing through the mixing portion 82. Because the second check valve 44 is in the open position, the mixture of air and purge vapor flows from the mixing portion 82 into the second check valve cavity 56b, through the vents 74b, the second port 50, and into the sixth conduit 20f, where the mixture of air and purge vapor then flows into the intake passage 20a. The mixture of purge vapor and air then flows through the turbocharger unit 12, the throttle assembly 14, and into the intake manifold 16.

The three-port turbo purge module 18 of the present invention utilizes only three connections to the rest of the vapor purge system 10. The connections of the fourth conduit 20d to the first port 46, the fifth conduit 20e to the inlet port 22, and the sixth conduit 20f to the second port 50 reduces the number of components needed to direct the purge vapor from the carbon canister 100 through the vapor purge system 10. The reduced number of connections and the integration of the venturi device 84 into the three-port turbo purge module 18 also allows for the three-port turbo purge module 18 to meet more stringent packaging requirements, and reduce cost and complexity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a three-port turbo purge module, including:
     a housing;
     a cavity disposed in the housing;
     an inlet port in fluid communication with the cavity;
     a first check valve selectively in fluid communication with the cavity;
     a second check valve selectively in fluid communication with the cavity;
     a venturi device disposed in the cavity;
     a first mode of operation, where the first check valve is open, and the second check valve is closed such that purge vapor flows from the inlet port into the cavity, and through the first check valve;
     a second mode of operation where the first check valve is closed such that pressurized air is accelerated through the venturi device, and the second check valve is open such that purge vapor flows from the inlet port into the cavity, through the venturi device and mixes with the high-velocity air, and through the second check valve;
     a first port selectively in fluid communication with the cavity, such that purge vapor flows from the cavity, through the first check valve and into the first port when the first check valve is open during the first mode of operation, and high-velocity air flows from the first port to the venturi device when the first check valve is closed during the second mode of operation;
   wherein the high-velocity air flowing through the venturi device during the second mode of operation generates vacuum pressure in the cavity, directing purge vapor through the venturi device;
   wherein the first port is in fluid communication with a conduit in an area of the conduit that is upstream of the intake manifold of an engine and downstream from a turbocharger unit.

2. The apparatus of claim 1, further comprising:
   a second port selectively in fluid communication with the cavity when the second check valve is open during the second mode of operation, and fluid communication between the second port and the cavity is prevented when the second check valve is closed during the first mode of operation;
   wherein the second port is in fluid communication with an intake passage at an area of the intake passage that is located upstream of the turbocharger unit.

3. The apparatus of claim 1, wherein the turbocharger unit is inactive and the intake manifold generates vacuum pressure during the first mode of operation, and the turbocharger is active and the intake manifold operates under positive pressure during the second mode of operation.

4. The apparatus of claim 1, further comprising:
   an inlet port in fluid communication with a carbon canister containing purge vapor;
   wherein the flow of purge vapor from the inlet port to the cavity is controlled by a valve.

5. The apparatus of claim 1, the venturi device further comprising:
   a jet portion in fluid communication with the cavity; and
   a mixing portion located in the cavity and downstream from the jet portion;
   wherein during the second mode of operation, the first check valve is closed such that pressurized air is accelerated through the jet portion and into the mixing portion, creating the vacuum pressure in the cavity such that the purge vapor in the cavity flows into and mixes with the high-velocity air flowing into the mixing portion.

6. The apparatus of claim 5, the venturi device further comprising:
   a valve seat integrally formed as part of the mixing portion;
   wherein the second check valve is in contact with the valve seat when the second check valve is closed, and the second check valve is moved away from the valve seat when the check valve is open.

7. The apparatus of claim 5, further comprising:
   a first side wall formed as part of the housing; and
   a second sidewall formed as part of the housing;
   wherein the jet portion is mounted to the first side wall, and part of the mixing portion is integrally formed as part of the second sidewall.

8. The apparatus of claim 1, wherein during the second mode of operation the high-velocity air flowing through the venturi device applies pressure to the second check valve such that the second check valve is opened.

9. A three-port turbo purge module, comprising:
   a housing;
   a cavity disposed in the housing;
   a first check valve;
   a second check valve;
   a first port selectively in fluid communication with the cavity when the first check valve is open;
   a second port selectively in fluid communication with the cavity when the second check valve is open;
   a venturi device disposed in the cavity;
   a first mode of operation, where the first check valve is open, and the second check valve is closed such that purge vapor flows from the inlet port into the cavity, through the first check valve, and through the first port;

a second mode of operation where the first check valve is closed such that pressurized air flowing into the first port is accelerated through the venturi device, opening the second check valve such that purge vapor flows from the inlet port into the cavity and mixes with air flowing through the venturi device, then flows through the second check valve and through the second port;

a jet portion in fluid communication with the first port and the cavity; and a mixing portion located in the cavity and downstream from the jet portion;

wherein the pressurized air flowing into the first port during the second mode of operation applies pressure to the first check valve, closing the first check valve, and during the second mode of operation, pressurized air flowing from the first port accelerates through the jet portion and is directed into the mixing portion, increasing the velocity of the air and creating the vacuum pressure in the cavity such that the purge vapor in the cavity flows into and mixes with the high-velocity air flowing into the mixing portion.

10. The three-port turbo purge module of claim 9, further comprising an inlet port in fluid communication with a carbon canister such that purge vapor is directed from the carbon canister through the inlet port and into the cavity.

11. The three-port turbo purge module of claim 9, wherein the first port is in fluid communication with a conduit in an area of the conduit that is upstream of an intake manifold of an engine and downstream from a turbocharger unit, and the second port is in fluid communication with an intake passage at an area of the intake passage that is located upstream of the turbocharger unit.

12. The three-port turbo purge module of claim 9, the venturi device further comprising:
a valve seat integrally formed as part of the mixing portion;
wherein the second check valve is in contact with the valve seat when the second check valve is closed, and the second check valve is moved away from the valve seat when the check valve is open.

13. The three-port turbo purge module of claim 9, further comprising:
a first side wall formed as part of the housing, the first check valve partially mounted to the first side wall; and
a second sidewall formed as part of the housing, the second check valve partially mounted to the second side wall;
wherein the jet portion is mounted to the first side wall, and part of the mixing portion is integrally formed as part of the second sidewall.

14. The three-port turbo purge module of claim 9, wherein during the second mode of operation the high-velocity air flowing through the venturi device applies pressure to the second check valve such that the second check valve is opened.

* * * * *